United States Patent [19]

Hachtel et al.

[11] 4,356,732

[45] Nov. 2, 1982

[54] TORQUE AND TORSION ANGLE MEASURING APPARATUS

[75] Inventors: Hansjörg Hachtel, Weissach; Klaus Dobler, Gerlingen, both of Fed. Rep. of Germany

[73] Assignee: Robert Bosch GmbH, Stuttgart, Fed. Rep. of Germany

[21] Appl. No.: 213,589

[22] Filed: Dec. 5, 1980

[30] Foreign Application Priority Data

Dec. 19, 1979 [DE] Fed. Rep. of Germany ....... 2951148

[51] Int. Cl.³ .............................................. G01L 3/10
[52] U.S. Cl. ................................... 73/862.33; 336/30
[58] Field of Search ............... 73/862.33; 324/208, 324/209; 336/30, 135

[56] References Cited

U.S. PATENT DOCUMENTS

| 3,329,012 | 7/1967 | Demuth | 73/862.33 |
| 3,336,525 | 8/1967 | Church | 336/30 X |
| 3,729,991 | 5/1973 | Hardway, Jr. | 73/862.33 |
| 3,823,608 | 7/1974 | Pantermuehl et al. | 73/862.33 |

Primary Examiner—Charles A. Ruehl
Attorney, Agent, or Firm—Frishauf, Holtz, Goodman & Woodward

[57] ABSTRACT

Measuring apparatus for the torque transmitted through a shaft consists of a first and second induction member respectively mounted at the input and the output end of the shaft for rotation therewith. The induction members are discs or concentric cylindrical elements made of a conductive material, each member having sector-shaped cut-out portions. The sector-shaped cut-out portions of the two members are aligned for a predetermined starting torque. A coil is mounted opposite one of the members and generates a high frequency magnetic field. The magnetic field induces eddy currents in the members. The eddy currents in the second member increase as the conduction material of the second member shifts toward exposure to the coil through the cut-out portions of the first member. Increases in eddy currents cause decreases in inductivity of the coil which, when measured, constitute a measure of the transmitted torque.

20 Claims, 21 Drawing Figures

TORQUE AND TORSION ANGLE MEASURING APPARATUS

The present invention relates to measuring apparatus for measuring the torque or torsion angle of a stationary or rotating shaft.

BACKGROUND AND PRIOR ART

It is known that torque can be measured by measuring the torsional angle or twist of a rotating or stationary shaft which transmits the torque to be measured. The torsion angle which results over a predetermined length of the shaft is a direct measure of the torque and proportional thereto.

Known measuring systems of this type operate by means of optical, capacitive of inductive units which, however, are sensitive to dirt, oil, temperature changes, and the like.

THE INVENTION

It is an object of the present invention to furnish a contactless measuring apparatus which, for example, may be operated in oil without influencing the accuracy of the measurement. It is a further object to supply measuring apparatus which is economical to manufacture, requires litte space and wherein the torque transmitted by either a rotating or a stationary shaft can be measured without the use of electrical contacts and without the use of slip rings. This type of apparatus is particularly suitable for use in automatic transmissions of motor vehicles.

In accordance with the present invention, a first and second induction member are mounted on the shaft, and more specifically, the first is mounted for rotation with the input end of the shaft, while the second rotates with the output end. The two induction members are mounted in close proximity to one another. A coil which is substantially concentric with the shaft is mounted in proximity to the two induction members. It generates an electric field which, in turn, generates eddy currents in the two induction members. The eddy currents increase as the shielding by the conductor portions of the first induction member of the conductive portions of the second induction member decreases. A change in eddy currents effects a change in inductivity of the coil, the latter thereby constituting a measure of the transmitted torque.

Preferably, the first and second induction members are discs made of an electrically conductive material. The discs have cut-out portions in the shape of sectors which constitute the electrically non-conductive parts. The cut-out portions of one disc are substantially identical to those of the other disc.

Instead of two adjacent discs having the same cut-out sections, the inductive impedance of the coil can be affected by eddy currents generated in an induction member which is a pipe concentric to the shaft. The pipe has cut-out sections which extend parallel to its axis. The cut-out sections are brought into registry with tooth shaped projections on a shaft within the pipe for a predetermined torsion angle. The shaft and its projections are also made of electrically conductive material.

DESCRIPTION OF THE PREFERRED EMBODIMENT

Figure 1:
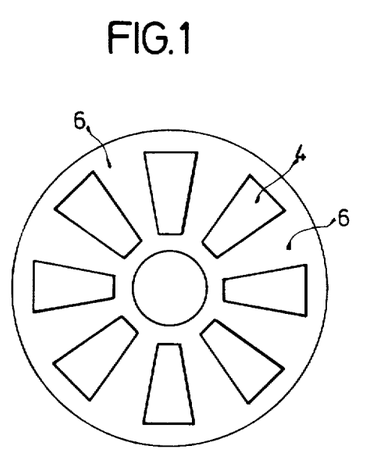
FIG. 1 shows one of two identical discs of a measuring apparatus according to the present invention.
Figure 2:
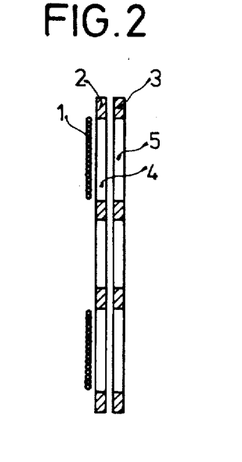
FIG. 2 is a side view of the disc of FIG. 1.

FIGS. 1 and 2 illustrate the basic arrangement of the measuring apparatus of the present invention. Included are two induction discs 2 and 3 which are substantially identical to each other. Each may, for example, have four sector-shaped cut-away portions 4 which are arranged at regular intervals in the peripheral direction. Both discs are made of electrically conductive material, sections 4 of induction disc 2 being aligned with sections 4 of induction disc 3. Alternatively, the induction discs may be made of non-conductive material electrically conductive material being applied to the discs in segment-shaped areas. For example, printed circuit boards with evaporated films or layers of conductive material pasted thereon would be suitable. A stationary single layer coil 1 faces the side of the first induction disc 2 which faces away from disc 3. A high frequency alternating current flows through coil 1.

Operation: The alternating current generates a magnetic field which generates eddy currents in induction discs 2 and 3. The level of induced eddy currents increases with the area of conductivity material exposed to the coil, so that more eddy current are induced when a larger surface of both induction discs 2 and 3 is penetrated by the magnetic field from the coil 1. When the two discs are exactly aligned with each other as is illustrated in FIG. 2, the second disc 3 is almost completely screened by the first disc 2. Therefore, in this position only a few eddy currents can be induced in second disc 3. This causes the inductivity of coil 1 to be relatively large. However, when the discs have a relative rotation to each other of 22.5°, a large amount of eddy currents is induced in disc 3 since the electrically conductive material of disc 3 is now lined up with the cut-out portions 4 of disc 2. For this maximum torsion angle, the inductivity of coil 1 has the lowest possible value.

Figure 3:
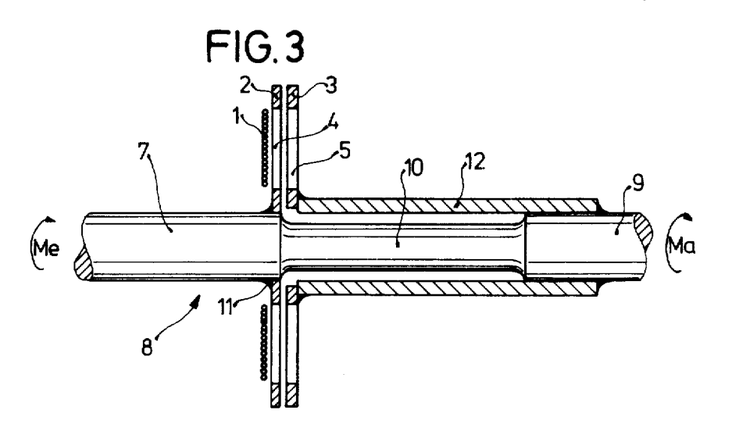
FIG. 3 is a longitudinal section of measuring apparatus utilizing two discs according to FIGS. 1 and 2.

The embodiment illustrated in FIG. 3 utilizes the basic principles illustrated in FIGS. 1 and 2.

In the partially sectional view of FIG. 3, reference numeral 7 refers to a part of shaft 8 to which an input torque Me is applied. This results in an output torque Ma at the end section 9 of shaft 8. The diameter of shaft 8 is decreased for a predetermined length between sections 7 and 9 so that a section 10 is formed which acts as a torsion spring rod. This section is twisted to a greater or lesser degree in dependence on the transmitted torque.

The angle of twist of section 8 must be measured. For this purpose, the first induction disc 2 is mounted on the starting section 7 of the shaft very close to section 10 and is connected to shaft 8 by soldering, pasting or welding at location 11. Disc 3 is arranged in close axial proximity behind disc 2 and is mounted on a pipe 12 which is mounted on section 9 of shaft 8 for rotation therewith. Discs 2 and 3 are so mounted that for a torque $Md=0$ or for a predetermined starting torque Mdo, the sector shaped cut-out portions 4 and 5 of discs 2 and 3 are aligned in the axial direction. The electrically conductive material of disc 3 is therefore shielded by that of disc 2. For increasing applied torque and therefore an increasing torsion angle of section 9 relative to section 7 of shaft 8, the electrically conductive material of disc 3 moves into the region of the cut-out portions 4 of disc 2 and is therefore penetrated by the magnetic field of coil 1. Therefore, additional eddy currents are generated in disc 3 which effect a decrease in inductivity of coil 1. Such decreases in inductivity can be measured with known measuring circuits. If, for torque $Md=0$, the sector-shaped cut-out portions of disc 3 are half covered by the sector-shaped portions of disc 2, then both positive and negative torques can be measured.

Figure 4:
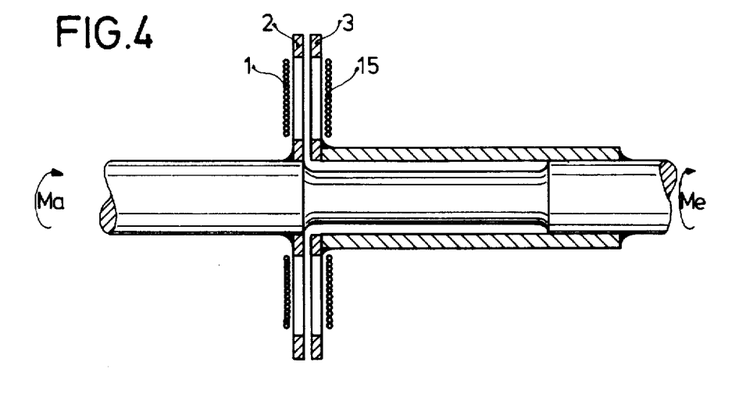
FIG. 4 is an alternate embodiment utilizing two helical flat coils.

The embodiment shown in FIG. 4 differs from that illustrated in FIG. 3 by the fact that a second coil 15 is mounted close to disc 3 in the axial direction and facing the surface of disc 3 which faces away from disc 2. Coil 15 is electrically connected to coil 1 so that the magnetic fields generated by the two coils reinforce one another, which results in the advantage that the change in impedance of coils 1 and 15 for relative rotation between discs 2 and 3 is substantially larger than the change in impedance of the arrangement shown in FIG. 3. Further, there is automatic compensation for any possible axial movement of the discs.

Figure 5:
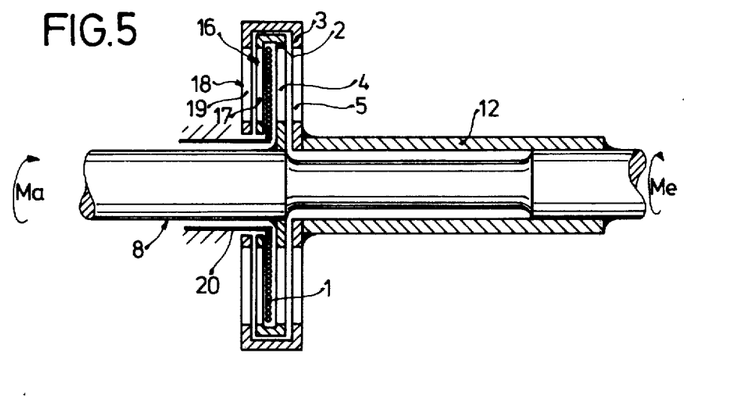
FIG. 5 is an axial view of a further embodiment utilizing two induction discs reinforced by two annular discs.

In the embodiment shown in FIG. 5, only a single induction coil 1 is provided, as was the case in FIG. 3. Coil 1 is mounted between first induction disc 2 and an annular disc 16, the latter being connected to induction disc 2 along its periphery. Disc 16 also has sector-shaped cut-out portions 17 which are aligned and identical to cut-out portions 4 of induction disc 2. Similarly, second induction disc 3 is connected to a ring-shaped disc 18 which, similar to that shown in FIG. 1, has eight sector-shaped cut-out portions 19. Induction coil 1 is a stationary coil fixedly mounted on a pipe-shaped carrier 20 which is coaxial with shaft 8. The impedance of coil 1 decreases with increasing torsion angles, since the magnetic field penetrates increasing amounts of the electrically conductive surfaces of the two induction discs and the ring-shaped discs. The sensitivity of the embodiment shown in FIG. 5 is greater than that of the simpler embodiment shown in FIG. 3. Further, the effects of noise are decreased and there is automatic compensation for axial movement of the shaft. In all of the above described embodiments, the induction members are disc shaped. In the embodiments to be described below, a concentric arrangement of cylindrical induction members is provided.

Figure 6:
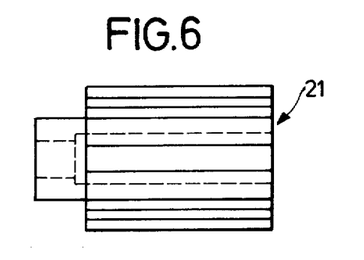
FIGS. 6–11 illustrate another embodiment of the present invention with cylindircally shaped induction members.
Figure 7:
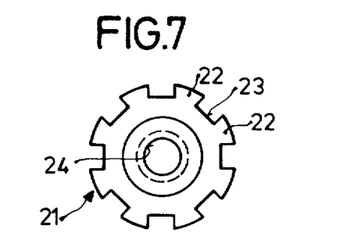

In FIG. 6, a cylindrical induction member (shaft) 21 is illustrated which is made of electrically conductive material. An axial view is shown in FIG. 7. As illustrated, shaft 21 has eight teeth 22 arranged at equal intervals around its periphery. Keyways 23 between teeth 22 are sufficiently deep that they constitute cut-out portions similar to portions 4 of the disc shaped induction member of FIG. 1.

Figure 8:
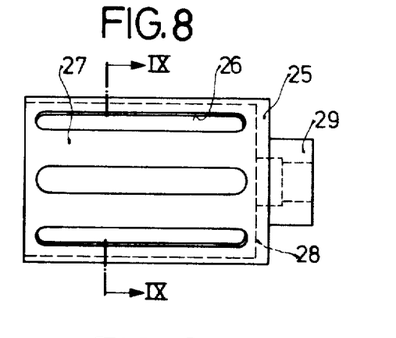
Figure 9:
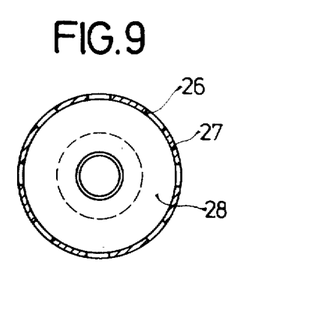
Figure 11:
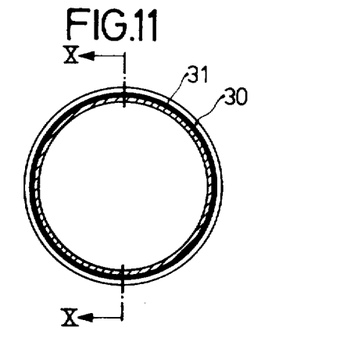
Figure 12:
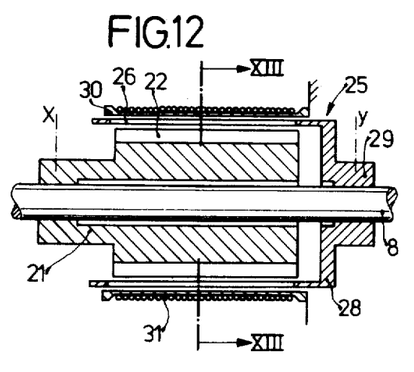
FIGS. 12 and 13 illustrate a complete embodiment of measuring apparatus with cylindrical induction members.
Figure 13:
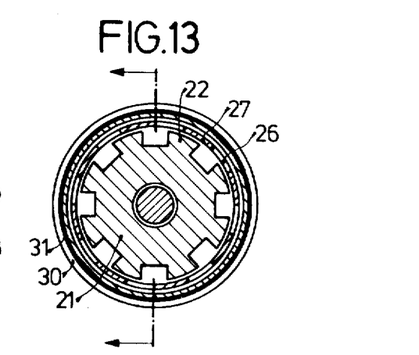

Induction member 21 has a central lengthwise bore 24 into which a shaft which is to be subjected to a torque (e.g. shaft 8 of FIG. 3) may be inserted. As illustrated in FIG. 8, a second pipe-shaped induction member 25 is arranged at the output end 9 of shaft 8. Induction member 25 has 8 cut-away portions 26 arranged around its periphery, the material remaining between the cut-away portions being denoted by reference numeral 27. A mounting disc 28, indicated by broken lines in FIG. 8, is positioned at one of the end surfaces of induction member 25. Disc 28 has a hub shaped projection 29 which allows fastening of induction member 25 onto shaft 8, as illustrated in FIG. 12. A plastic tube 30 is slipped over the unit including cylindrical induction members 21 and 25 at a short radial distance therefrom and concentric to shaft 8. Tube 30 is illustrated in an axial view in FIGS. 11 and 13. It carries an exciting coil 31 which, preferably, is wound in one layer and extends over the length of cut-away portions 26. Coil 31 is stationary and is fixedly mounted relative to a housing (not illustrated) as illustrated in FIG. 12.

When shaft 8 is subjected to a torque, the section between X and Y undergoes increasing twist with increasing torque. For increasing torque, the teeth 22 of induction member 21 extend more and more into the cut-out portions 26 of induction member 25 and therefore cause increased eddy currents to be generated which, in turn, decrease the impedance of coil 31.

Figure 10:
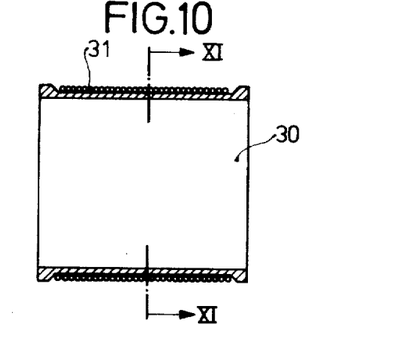
Figure 14:
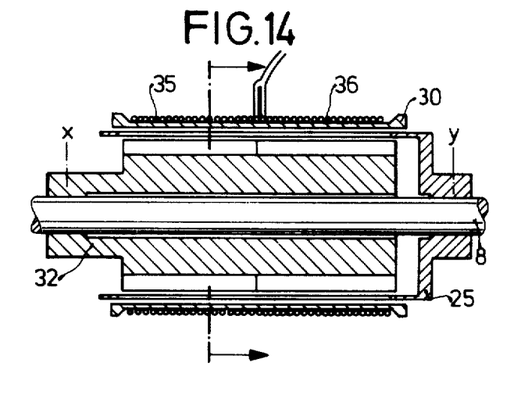
FIG. 14 is a longitudinal section of measuring apparatus utilizing a differential coil.
Figure 15:
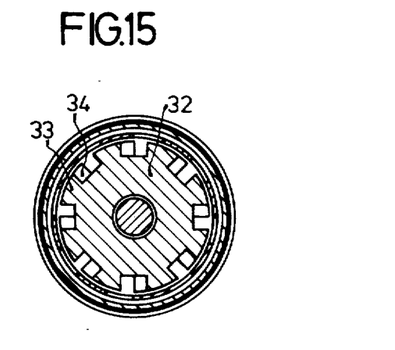
FIG. 15 is a transverse section of the apparatus shown in FIG. 14.
Figure 16:
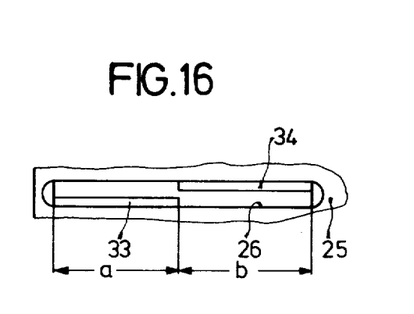
FIG. 16 is a sectional front view of the apparatus of FIG. 14.

A semi-differential arrangement is illustrated in FIGS. 14 to 16. The arrangement includes a cylindrical induction member 25 which is shaped in the same manner as that in FIG. 10 and which, with its window shaped cut-out portions 26, extends over the total axial length of an inner cylindrical induction member 32. Induction member 32 has a first set of teeth 33 arranged around its periphery. The teeth 33 only extend over half the axial length a. A second set of teeth 34 extends over the second half b, the second set of teeth being shifted relative to the first set by one-half the angles subtended by each tooth. (FIG. 16). As was the case in the embodiment illustrated in FIGS. 12 and 13, a tube 30 is slipped over induction member 25 at a small radial distance therefrom. However, two partial windings 35 and 36 extend over the axial length of the tube 30. Partial windings 35 and 36 have the same electromagnetic characteristics and are connected in series with one another. When teeth 33 and 34 are in the zero position illustrated in FIG. 16, the impedance of winding 35 is the same as that of winding 36. As soon as induction member 25 rotates relative to induction member 32 due to an applied torque, and for example, teeth 34 start to leave cutaway section 26, while teeth 33 move into cutaway section 26, the impedance of the right winding will increase, while the impedance of partial winding 35 will be decreased because of the increasing eddy currents in teeth 33.

Figure 17:
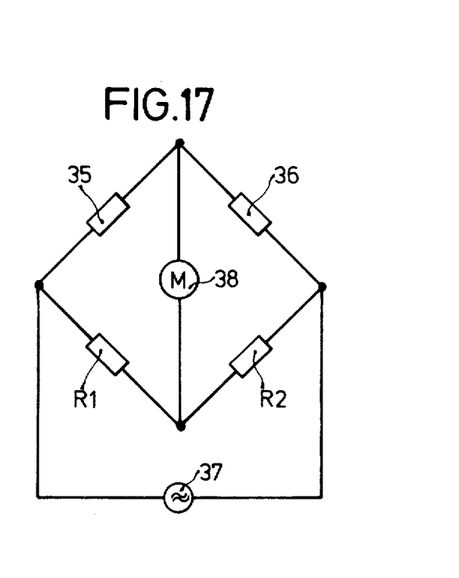
FIG. 17 is a schematic diagram illustrating apparatus for measuring the impedance change in the apparatus of FIGS. 14–16.

This impedance change can readily be measured in a Wheatstone bridge as illustrated in FIG. 17. A current source 37 supplies alternating high frequency current to the bridge circuit, which consists of two AC resistors R1 and R2 and windings 35 and 36. If the bridge is balanced for the position of teeth 33 and 34 illustrated in FIG. 16, the unbalance of the bridge resulting from a torsion angle, and thus the torque can be measured by a measuring instrument 38 connected as shown in FIG. 17.

Figure 18:
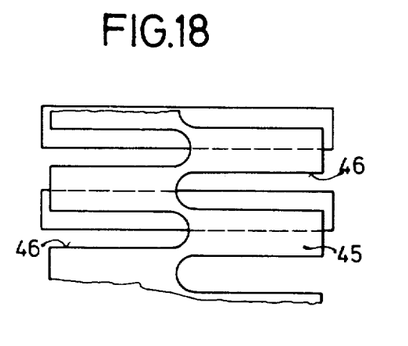
FIG. 18 is a developed sectional view of a further embodiment of measuring apparatus utilizing cylindrical differential coils.
Figure 19:
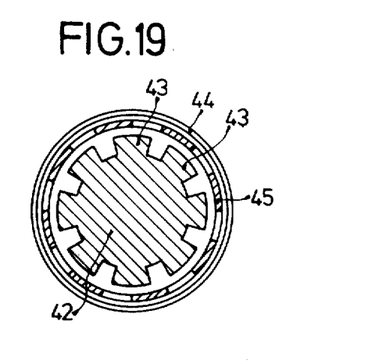
FIG. 19 is a transverse section of the apparatus shown in FIG. 18.

The embodiment shown in FIGS. 18 and 19 is in a sense the technical inverse of the arrangement shown in FIGS. 14 to 16. As shown in FIG. 19, a cylindrical induction member 42 has teeth 43 arranged along its periphery. The teeth extend along the full length of cylinder 42 and are therefore easy to manufacture. Tube 44 shown in FIG. 19 corresponds exactly to the same tube shown in FIG. 14. It carries two partial windings 35 and 36 so that the electromagnetic characteristics are the same. A casing 45 is interposed between tube 40 and induction member 42. A sectional development of casing 45 is shown in FIG. 18. The casing has cutaway portions 46 which are milled alternately from both faces of the casing, but contrary to that shown in FIG. 16, extend only to the center. Cutaway portions 46 thus divide the measuring region into two partial regions a and b as indicated in FIG. 16.

The operation and the type of measuring equipment required for this embodiment correspond exactly to those of the embodiments shown in FIG. 16 or 17.

Figure 20:
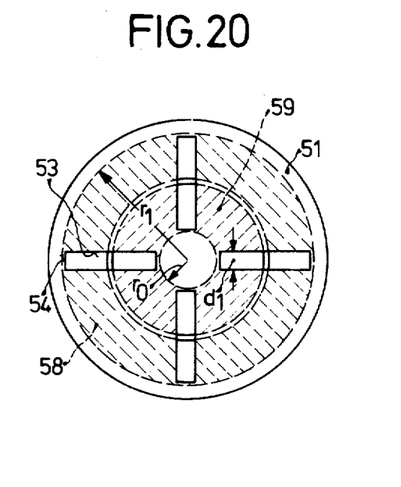
FIG. 20 is an axial front view of one of the two discs of the differential coil measuring apparatus.
Figure 21:
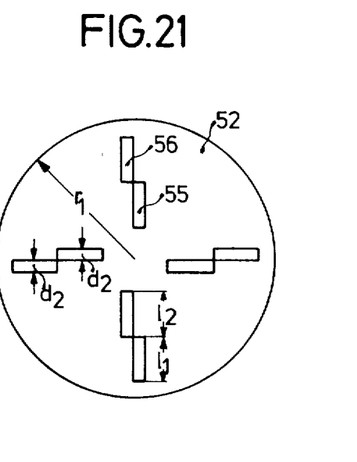
FIG. 21 is the other disc of the apparatus shown in FIG. 20.

Two equally valued measuring regions a and b can also be provided for disc shaped induction members as illustrated in FIGS. 20 and 21. Induction discs 51 and 52 are made of electrically highly conductive material. Disc 41 has four cutaway sections 53 which are radially arranged narrow rectangles. The outer surfaces 54 of each rectangle lie on a circle having a radius r1. The second induction disc 52, arranged at a short axial distance from disc 51 as illustrated in FIG. 3, has two sets of four cutaway sections. The first set includes four inner cutaway sections 55, while the second set includes four outer cutaway sections 56. All the cutaway sections have the same width d2 measured in the peripheral direction, the width d2 being equal to one-half the width d1 of cutaway portions 53 of disc 51. In order to implement the differential measuring principle, the radial lengths l1 and l2 of cutaway sections 55 and 56, respectively, are equal to one-half of the length of cutaway sections 53 of disc 51. Further, the inner cutaway sections 55 are angularly shifted relative to the outer cutaway portions 56.

A single exciter coil, preferably of one layer, is provided for discs 51 and 52. The coil is positioned opposite the face of induction disc 51 which faces away from induction disc 52. This corresponds to the arrangement shown in FIG. 3. However, contrary to coil 1 shown in FIGS. 2 and 3, the coil for the embodiments shown in FIGS. 20 and 21 consists of two flat coils 58 and 59, each of which extends in the radial direction over one-half of the length of cutaway portion 53. For clarity, the windings are indicated with a diagonal shading in FIG. 20. The outer exciter coil 58 interacts only with outer cutaway portions 56 of the induction disc 52, while the inner coil 59 only interacts with the inner cutaway portions 55 of the second induction coil. It should, however, be noted that to achieve greater impedance changes in these coils, it would be better to provide more cutaway portions than are illustrated in FIGS. 20 and 21. For example, eight cutaway portions would provide an improvement over the four illustrated in FIGS. 20 and 21.

The output signals signifying the transmitted torque or twisting angle can be derived from the bridge circuit shown in FIG. 17. A division of the exciter coil into two partial coils and the arrangement of each of the partial coils in bridge branches terminating at a common point to which the measuring instrument is connected has the great advantage that no errors occur due to temperature variations and therefore variations in the conductivity of the coils. This, of course, is of major importance in automobiles.

Various changes and modifications may be made within the scope of the inventive concepts.

We claim:
1. Torque and torsion angle measuring apparatus comprising
   a shaft (8) having an input end portion (7) and an output end portion (9);
   a first induction member (2) concentric to said shaft and mounted on said input end portion for rotation therewith, said first induction member having electrically conductive portions (6) and electrically insulating portions (4);
   a second induction member mounted on said output end portion for rotation relative to said first induction member, said second induction member having electrically conductive portions (3) and electrically insulating portions (5) overlapping corresponding portions of said first induction member to a predetermined extent prior to application of a torque to be measured;
   a coil (1) at least approximately concentric to said shaft arranged in close proximity to said first and second induction members so that a magnetic field generated by said coil creates eddy currents in said second induction member varying in dependence upon the relative alignment of said electrically conductive portions of said first and second induction members, to effect a change in inductivity of said coil upon change in eddy currents to provide a measure of angular displacement of the input end portion to the output end portion of said shaft.

2. Measuring apparatus as set forth in claim 1, wherein alignment of said electrically conductive portions of said first and second induction members decreases with increasing torque transmitted through said shaft causing relative angular displacement, or twist, of said shaft portions, thereby increasing said eddy currents and decreasing said inductivity.

3. Measuring apparatus as set forth in claim 1, wherein said first and second induction members each comprises a disc (2, 3, 16, 18; 51, 52).

4. Measuring apparatus as set forth in claim 3, wherein each of said discs is made of electrically conductive material; and wherein said first disc has a plurality of substantially identical cut-out portions (6) spaced at equal intervals in the peripheral direction thereof.

5. Measuring apparatus as set forth in claim 4, wherein said second disc is substantially identical to said first disc.

6. Measuring apparatus as set forth in claim 5, wherein each of said cut-out portions is sector-shaped.

7. Measuring apparatus as set forth in claim 3, wherein said second induction disc is arranged at a short distance from one side of said first induction disc, and wherein said coil is arranged a short distance from said first induction disc on the side facing away from said second induction disc.

8. Measuring apparatus as set forth in claim 7, further comprising a second coil (15) arranged in proximity to said second induction disc on the side facing away from said first induction disc.

9. Measuring apparatus as set forth in claim 8, wherein said second coil is a flat coil having a one layer winding.

10. Measuring apparatus as set forth in claim 7, further comprising a ring shaped disc concentric to said shaft and at a small axial distance from said first induction disc, said ring shaped disc having a peripheral region mechanically coupled to the peripheral region of said first induction disc, and a plurality of cut-out portions (17) having substantially the same shape as the cut-out portions of said first induction disc.

11. Measuring apparatus as set forth in claim 4, wherein said cut-out portions of a selected one of said induction discs extend a predetermined distance in the radial direction thereof;

wherein said cut-out portions of the other of said induction discs each comprises a first part having a first predetermined length measured in the radial direction of said disc and a second part having a second predetermined length measured in said radial direction and shifted relative to said first part by a predetermined angle;

wherein said coil is a first coil arranged in a plane perpendicular to said shaft and extending only over said second part of said cut-out portions; and further comprising a second coil (59) arranged in the same plane as said first coil coaxially therewith and extending over only said first part of said cut-out portions.

12. Measuring apparatus as set forth in claim 11, wherein said first and second parts of said cut-out portions each have the same width measured in the direction of rotation of said shaft; and wherein said second part is shifted relative to said first part by a distance equal to said width.

13. Measuring apparatus as set forth in claim 12, wherein said cut-out portions of said selected one of said discs each have a predetermined width;

and wherein said width of said first and second parts of said cut-out portions of said other of said discs is one-half said predetermined width.

14. Measuring apparatus as set forth in claim 1, wherein said coil is a disc-shaped flat coil.

15. Measuring apparatus as set forth in claim 14, wherein said flat coil is a single layer winding.

16. Measuring apparatus as set forth in claim 1, wherein said first and second induction members are both cylindrically shaped.

17. Measuring apparatus as set forth in claim 16, wherein said first induction member is a shaft having a plurality of peripheral tooth-shaped projections;

wherein said second induction member is a casing surrounding said first induction member, said casing having a plurality of cut-out portions (26, 46) extending in the axial direction thereof; and wherein said coil is a cylindrical coil mounted coaxially to said first and second induction member.

18. Measuring apparatus as set forth in claim 17, wherein said coil is divided into a first and second winding (35,36) arranged next to each other in the axial direction of said induction members, and wherein each of said cut-out portions of said casing has a length measured in the axial direction of approximately one-half the axial length of said induction member, and a predetermined width measured in the direction of rotation, each of said cut-out portions being shifted relative to the next subsequent one by a distance in the peripheral direction of at least one-half of said width.

19. Measuring apparatus as set forth in claim 18, wherein said first and second winding constitute part of the Wheatstone bridge circuit, said Wheatstone bridge circuit further comprising a measuring instrument;

and wherein said first and second winding and said measuring instrument are electrically directly connected to each other.

20. Measuring apparatus as set forth in claim 1, wherein at least one of said induction members is a hollow, essentially tubular element (25) and the other induction member extends telescopically within said essentially tubular element.

* * * * *

REEXAMINATION CERTIFICATE (566th)
United States Patent [19]
Hachtel et al.

[11] B1 4,356,732

[45] Certificate Issued    Sep. 16, 1986

[54] TORQUE AND TORSION ANGLE MEASURING APPARATUS

[75] Inventors: Hansjörg Hachtel, Weissach; Klaus Dobler, Gerlingen, both of Fed. Rep. of Germany

[73] Assignee: Robert Bosch GmbH, Stuttgart, Fed. Rep. of Germany

Reexamination Request:
No. 90/000,834, Aug. 12, 1985

Reexamination Certificate for:
Patent No.: 4,356,732
Issued: Nov. 2, 1982
Appl. No.: 213,589
Filed: Dec. 5, 1980

[30] Foreign Application Priority Data

Dec. 19, 1979 [DE] Fed. Rep. of Germany ....... 2951148

[51] Int. Cl.$^4$ .............................................. G01L 3/10
[52] U.S. Cl. ................................... 73/862.33; 336/30
[58] Field of Search .................. 73/862.33; 324/209; 336/30, 135

[56] References Cited

U.S. PATENT DOCUMENTS

| 3,329,012 | 7/1967 | Demuth | 73/862.33 |
| 3,336,525 | 8/1967 | Church | 336/30 X |
| 3,729,991 | 5/1973 | Hardway, Jr. | 73/862.33 |
| 3,823,608 | 7/1974 | Pantermuehl et al. | 73/862.33 |

FOREIGN PATENT DOCUMENTS

| 2118722 | 11/1972 | Fed. Rep. of Germany . |
| 2151761 | 4/1973 | Fed. Rep. of Germany . |
| 0532022 | 10/1976 | U.S.S.R. . |

*Primary Examiner*—Charles A. Ruehl

[57] ABSTRACT

Measuring apparatus for the torque transmitted through a shaft consists of a first and second induction member respectively mounted at the input and the output end of the shaft for rotation therewith. The induction members are discs or concentric cylindrical elements made of a conductive material, each member having sector-shaped cut-out portions. The sector-shaped cut-out portions of the two members are aligned for a predetermined starting torque. A coil is mounted opposite one of the members and generates a high frequency magnetic field. The magnetic field induces eddy currents in the members. The eddy currents in the second member increase as the conduction material of the second member shifts toward exposure to the coil through the cut-out portions of the first member. Increases in eddy currents cause decreases in inductivity of the coil which, when measured, constitute a measure of the transmitted torque.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–20 are cancelled.

New claims 21–29 are added and determined to be patentable.

21. *Torque and torsion angle measuring apparatus comprising*
   *shaft (8) having an input end portion (7) and an output end portion;*
   *a first essentially cylindrical induction member (21) concentric with said shaft and mounted on said input end portion for rotation therewith, said first induction member having cylindrical, electrically conductive portions and intervening insulating portions formed on the surface thereof;*
   *a second cylindrical induction member, mounted on said output end portion, surrounding and overlapping said first cylindrical induction member, said second cylindrical induction member having electrically conductive portions and electrically insulating portions, said electrically conductive and electrically insulating portions overlapping corresponding cylindrical conductive and insulating portions of said first induction member to a predetermined extent;*
   *and a cylindrical coil (30) closely surrounding said second induction member, and at least approximately concentric with said shaft, so that a magnetic field generated by said coil creates eddy currents in said second induction member varying in dependence on the relative alignment of the electrically conductive portions of said first and said second cylindrical concentric induction members, to effect a change in inductivity upon said coil upon change in eddy currents, in dependence on said alignment, and to thereby provide a measure of angular displacement of the input end portion to the output end portion of said shaft.*

22. *Measuring apparatus according to claim 21 wherein said first induction member comprises a generally cylindrical shaft-like element having a plurality of peripheral tooth-shaped projections;*
   *said second cylindrical induction member comprises a casing surrounding said toothed first induction member, said casing having a plurality of cut-out portions (26, 46) extending axially thereof, the material adjacent the plurality of cut-out portions forming conductive strips;*
   *and wherein said coil is a cylindrical coil mounted coaxially to the first and second induction members.*

23. *Measuring apparatus as set forth in claim 22, wherein said coil is divided into a first winding (35) and a second winding (36), said windings being arranged next to each other in the axial direction of said induction members, and wherein each of said cut-out portions of said casing has a length measured in the axial direction of approximately one-half the axial length of said casing and a predetermined width measured in the direction of rotation, each of said cut-out portions being shifted relative to the next subsequent one by a distance in the peripheral direction of at least one-half of said width.*

24. *Measuring apparatus as set forth in claim 23 wherein said first and second winding constitute part of a Wheatstone bridge circuit, said Wheatstone bridge circuit further comprising a measuring instrument;*
   *and wherein said first and second winding and said measuring instrument are electrically directly connected to each other.*

25. *Measuring apparatus according to claim 21 wherein said second induction member comprises a hollow, essentially tubular element, telescopically receiving the first induction member within said essentially tubular element.*

26. *Torque and torsion angle measuring apparatus comprising*
   *a shaft (8) having an input end portion (7) and an output end portion (9);*
   *a first induction member (2) concentric to said shaft and mounted on said input end portion for rotation therewith, said first induction member having electrically conductive portions (6) and electrically insulating portions (4);*
   *a second induction member mounted on said output end portion for rotation relative to said first induction member, said second induction member having electrically conductive portions (3) and electrically insulating portions (5) overlapping corresponding portions of said first induction member to a predetermined extent prior to application of a torque to be measured;*
   *a coil (1) at least approximately concentric to said shaft arranged in close proximity to said first and second induction members so that a magnetic field generated by said coil creates eddy currents in said second induction member varying in dependence upon the relative alignment of said electrically conductive portions of said first and second induction members, to effect a change in inductivity of said coil upon change in eddy currents to provide a measure to angular displacement of the input end portion to the output end portion of said shaft;*
   *said first and second induction members comprise a first induction disc and a second induction disc;*
   *said second induction disc is arranged at a short distance from one side of said first induction disc, and said coil is arranged at a short distance from said first induction disc on the side facing away from said second induction disc; and*
   *further comprising a ring shaped disc concentric to said shaft and at a small axial distance from said first induction disc, said ring shaped disc having a peripheral region mechanically coupled to the peripheral region of said first induction disc, and a plurality of cut-out portions (17) having substantially the same shape as the cut-out portions of said first induction disc.*

27. *Torque and torsion angle measuring apparatus comprising*
   *a shaft (8) having an input end portion (7) and an output end portion (9);*
   *a first induction member (2) concentric to said shaft and mounted on said input end portion for rotation therewith, said first induction member having electrically* conductive portions (6) and electrically insulating portions (4);

a second induction member mounted on said output end portion for rotation relative to said first induction member, said second induction member having electrically conductive portions (3) and electrically insulating portions (5) overlapping corresponding portions of said first induction member to a predetermined extent prior to application of a torque to be measured;

a coil (1) at least approximately concentric to said shaft arranged in close proximity to said first and second induction members so that a magnetic field generated by said coil creates eddy currents in said second induction member varying in dependence upon the relative alignment of said electrically conductive portions of said first and second induction members, to effect a change in inductivity of said coil upon change in eddy currents to provide a measure to angular displacement of the input end portion to the output end portion of said shaft;

said first and second induction members comprise a first induction disc and a second induction disc, wherein each of said first and second induction discs is made of electrically conductive material, and said first induction disc has a plurality of substantially identical cut-out portions (6) spaced at equal intervals in the peripheral direction thereof;

wherein said cut-out portions of a selected one of said induction discs extend a predetermined distance in the radial direction thereof;

wherein said cut-out portions of the other of said induction discs each comprises a first part having a first predetermined length measured in the radial direction of said disk and a second part having a second predetermined length measured in said radial direction and shifted relative to said first part by a predetermined angle;

wherein said coil is a first coil arranged in a plane perpendicular to said shaft and extending only over said second part of said cut-out portions; and further comprising a second coil (59) arranged in the same plane as said first coil coaxially therewith and extending over only said first part of said cut-out portions.

28. Measuring apparatus as set forth in claim 27, wherein said first and second parts of said cut-out portions each have the same width measured in the direction of rotation of said shaft; and wherein said second part is shifted relative to said first part by a distance equal to said width.

29. Measuring apparatus as set forth in claim 28, wherein said cut-out portions of said selected one of said discs each have a predetermined width;

and wherein said width of said first and second parts of said cut-out portions of said other of said discs is one-half said predetermined width.

* * * * *